W. V. R. BLIGHTON.
Thill-Coupling.

No. 222,621. Patented Dec. 16, 1879.

Witnesses:
T. H. Parsons
J. R. Drake

Wm V. R. Blighton
Inventor
by
J. R. Drake
atty.

UNITED STATES PATENT OFFICE.

WILLIAM V. R. BLIGHTON, OF TONAWANDA, NEW YORK.

IMPROVEMENT IN THILL-COUPLINGS.

Specification forming part of Letters Patent No. 222,621, dated December 16, 1879; application filed June 7, 1879.

*To all whom it may concern:*

Be it known that I, WM. V. R. BLIGHTON, of Tonawanda, in the county of Erie and State of New York, have made certain Improvements in Thill-Couplings, of which the following is a specification.

This invention consists in the construction of the two parts, and so jointed together as to prevent rattling, as hereinafter fully described.

Figure 1:
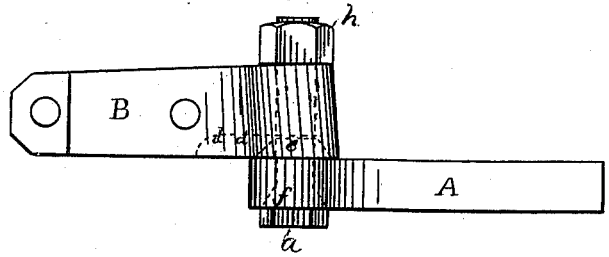
Figure 2:
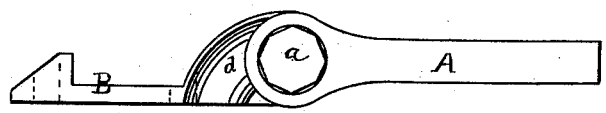
Figure 3:
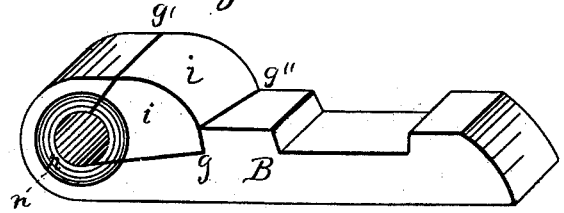
Figure 4:
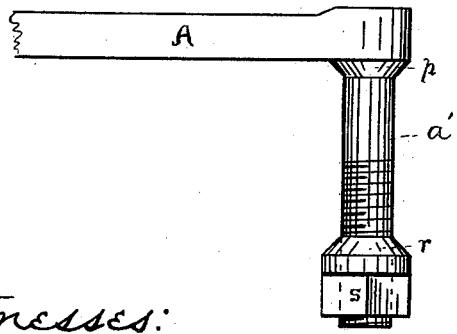

In the drawings, Figure 1 is a plan; Fig. 2, a side elevation; Fig. 3, a different construction of thill-draw, and Fig. 4 a detail.

A represents the thill-iron, and B the thill-draw, which will be attached to the axle by the usual clip. In the head of the draw B, which is enlarged, is an opening for the bolt $a$, which screws into it and holds the thill-iron and draw together, making the coupling. The thill-iron, where it unites with the draw B, has a conical shoulder, $c$, (shown in dotted lines, Fig. 1,) which sets into a curved hollow or recess, $d$, formed in one side of the head B. This is to make not only a close connection, but a passage for the conical head $c$ in and out when the thills are to be connected or disconnected therewith.

The shaft-iron A has a countersunk opening on its outer side for the reception of the conical head $f$ on the screw-bolt $a$, which fits therein. This bolt screws through the parts A and B, as shown in dotted lines in Fig. 1.

$h$ is a jam-nut on the end, to aid in keeping the bolt in tightly.

In Fig. 3 the thill-draw B is made slightly different as regards taking out or putting in the shafts—that is, instead of the side recess, $d$, as in Figs. 1 and 2, a somewhat conical groove, $g$, is made in the top of the draw B, at or near the head at $g'$ $g''$, and a separate piece, $i$, set or dovetailed therein. The removal of this piece $i$ answers the same purpose as the recess $d$, allowing the putting in or taking out of the thill-iron A, which, in this case, will be made with a rigid bolt, $a'$, formed on the end thereof, at right angles, and with, also, a conical inner head, $p$, where it enters the thill-draw at the side, and which is provided with a corresponding recess or countersink, $n$, for this to set in; also, with a jam-nut, $s$, on the other end, with an inner conical projection, $r$, setting or screwing into a corresponding recess, $n'$, on that side of the thill-draw B, making both sides countersunk.

The advantages of this construction are, that all rattling is avoided, as flat faces or sides of either nuts, or thill-iron, or thill-draw are mostly done away with, and in place of this the side or sides of the draw and thill-iron are hollowed into recesses or countersinks for the reception of nuts, or the sides of the nuts made with rounded or conical sides, which gives close joints and easy play, and allows the closer tightening of the nuts and parts, so that if any looseness is observed, and consequently any rattling, the nuts can be tightened a little. It also does away with rubber or leather washers or packing of any sort, and allows of a more easy and convenient attachment of the thills to the axle. It is very strong, also, the draft being on a strong metal head.

I claim—

The thill-draw B, having the side recess, $d$, in combination with the thill-iron A, one side of which is formed into a rounded projection, $c$, where it enters and sets in the recess $d$, and the other side countersunk to receive the head of the bolt $a$, which screws into and holds the two parts together, which has a corresponding rounded or conical projection, $f$, thereon, all substantially as and for the purpose specified.

In witness whereof I have hereunto signed my name in the presence of two subscribing witnesses.

W. V. R. BLIGHTON.

Witnesses:
   J. R. DRAKE,
   T. H. PARSONS.